April 30, 1940.  A. R. BRANSON  2,198,857
ROLLER SKATING DEVICE
Filed Sept. 30, 1937   3 Sheets-Sheet 1

INVENTOR.
Alan R. Branson
BY
ATTORNEY.

April 30, 1940.  A. R. BRANSON  2,198,857
ROLLER SKATING DEVICE
Filed Sept. 30, 1937   3 Sheets-Sheet 2

INVENTOR.
BY Alan R. Branson
ATTORNEY.

April 30, 1940.    A. R. BRANSON    2,198,857
ROLLER SKATING DEVICE
Filed Sept. 30, 1937    3 Sheets-Sheet 3

INVENTOR.
Alan R. Branson
BY
ATTORNEY.

Patented Apr. 30, 1940

2,198,857

UNITED STATES PATENT OFFICE 2,198,857

ROLLER SKATING DEVICE

Alan R. Branson, Wellington, Ohio

Application September 30, 1937, Serial No. 166,513

3 Claims. (Cl. 280—11.23)

This invention relates to skating and the like devices wherein the foot of the operator engages a support adjacent the surface over which the device is propelled, and more particularly to a device of this type having a single wheel.

Devices of the above general type, including roller skates and scooters, have commonly employed two or more wheels or two or more points of rolling support, permitting the user to be primarily concerned with lateral balance or stability. I am aware that it has also been proposed to provide devices of this character with only one wheel or one point of rolling support, but these prior devices have had a support center at the center of rotation of the wheel or thereabove, which means that the center support is at the wheel axis relatively far removed from the contact point of the wheel, resulting in considerable leverage tending to overturn the wheel.

I have devised a one-wheel device for articles of this type, wherein the supporting element is disposed a substantial distance beneath the center of rotation of the wheel, or the center of support, thereby minimizing the overturning tendency as compared to a wheel wherein the supporting element is disposed a substantial distance above the surface upon which the wheel rolls.

It is an object of my invention, therefore, to provide a one-wheel device adapted to support the weight of an operator closely adjacent the surface upon which the wheel rolls, and minimizing the leverage effect tending to overturn the wheel.

Another object of my invention is to provide a relatively large wheel, providing a one-point rolling support for skating devices and similar contrivances, wherein the point of support for the operator is disposed closely adjacent the surface upon which the wheel rolls, and in a manner to minimize the leverage effect of a device strapped to the operator's leg.

Another object of my invention is to provide a one-wheel skating or the like device having a relatively large wheel and wherein the center of support is disposed a substantial distance beneath the center of rotation of the wheel, whereby the leverage effect tending to overbalance the wheel will be reduced to a minimum.

Another object of my invention is to provide a one-wheel skating or the like device having a support for the operator closely adjacent the surface upon which the wheel operates, providing a minimum of lateral pressure on the leg of an operator, to which the device is secured.

Another object of my invention is to provide a one-wheel skating or the like device of the above type, having improved means providing a bearing construction protected from the ingress of foreign material.

Another object of my invention is to provide a one-wheel skating or the like device wherein the wheel is relatively large in diameter, and a support element adapted to engage the foot of the user is disposed a substantial distance below the center of rotation of the wheel and adjacent the wheel periphery to increase the stability of the wheel.

Another object of my invention is to provide a one-wheel skating or the like device having improved brake means associated therewith.

Other objects of my invention and the invention itself will become increasingly apparent from a consideration of the following description and drawings, wherein.

Figures 1, 2:
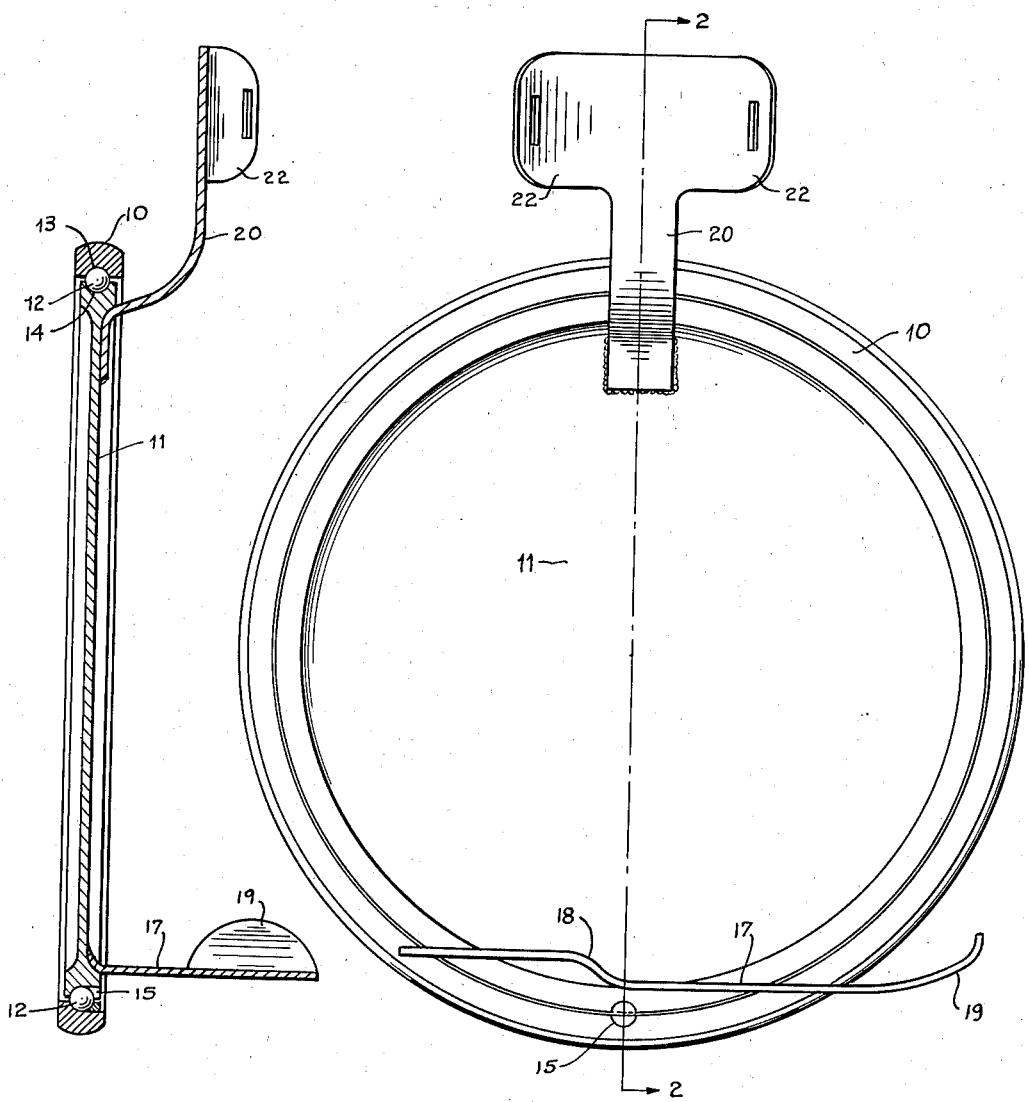
Fig. 1 is a side elevational view of a one-wheel roller skate device embodying my invention.
Fig. 2 is a section taken along the line 2—2 of Fig. 1.

Referring now to the drawings, and particularly to Figs. 1 and 2, I have illustrated at 10 a wheel rotatably mounted on a disc-form wheel body 11 by balls 12. Although I have shown the wheel 10 as having a metal road-engaging surface, it is understood that a solid rubber or pneumatic tire may be mounted on the wheel, or a tire formed of suitable composition may be used.

The wheel 10 is provided with a continuous groove 13 on its inner wall, the grove being substantially semi-circular in cross-section. The wheel body 11 is provided with a cooperating generally similar groove 14, and the balls may be inserted through an opening 15 to lock the wheel and wheel body in assembled relation. The opening 15 may be partially closed to prevent an inadvertent removal of the balls 14, by any suitable means such as half-round plugs engaging either the wheel 10 or the wheel body 11. Welded or otherwise rigidly secured to the wheel body adjacent the lower portion thereof is a plate 17 preferably bent as indicated at 18, forming a support for the foot of a user of the skate device.

The plate 17 may be extended to any desired length, and a forward portion is preferably curved as indicated at 19, whereby the plate support 17 may be tilted forwardly to engage the surface upon which the skate device is rolling and act as a brake, the curved portion 19 preventing the plate from digging into the surface which it contacts.

The support may be secured to the foot in any desired manner, as by straps, clamps engaging the sole of the shoe, or a shoe may be permanently secured to the plate in a well known manner.

A leg bracket 20 comprises an upstanding arm welded or otherwise rigidly secured to the wheel body and bent to be spaced therefrom has the upper portion of the arm extending laterally and terminating in flanges 22 perforated to permit straps to be passed therethrough which encircle the calf of the leg, and together with the plate support 17 secure the skate device with the leg and foot of the user. Any desired means other than that illustrated may be used for securing the device to the calf of the leg.

The wheel 10 is relatively large, and is preferably ten inches or greater in diameter, and due to the fact that the weight is supported a substantial distance below the center of rotation of the wheel, together with the large diameter of the wheel, considerable stability may be effected even though only one wheel is employed.

Although the load is necessarily eccentric of the wheel, relatively little lateral pressure is exerted against the calf of the leg due to the plate 17 being supported closely adjacent the point of contact of the wheel with the supporting surface, and about which the device would tend to fulcrum.

I prefer that the minimum diameter of the wheel 10 be ten inches, and contemplate that this diameter may be considerably increased.

Figures 3, 4, 5:
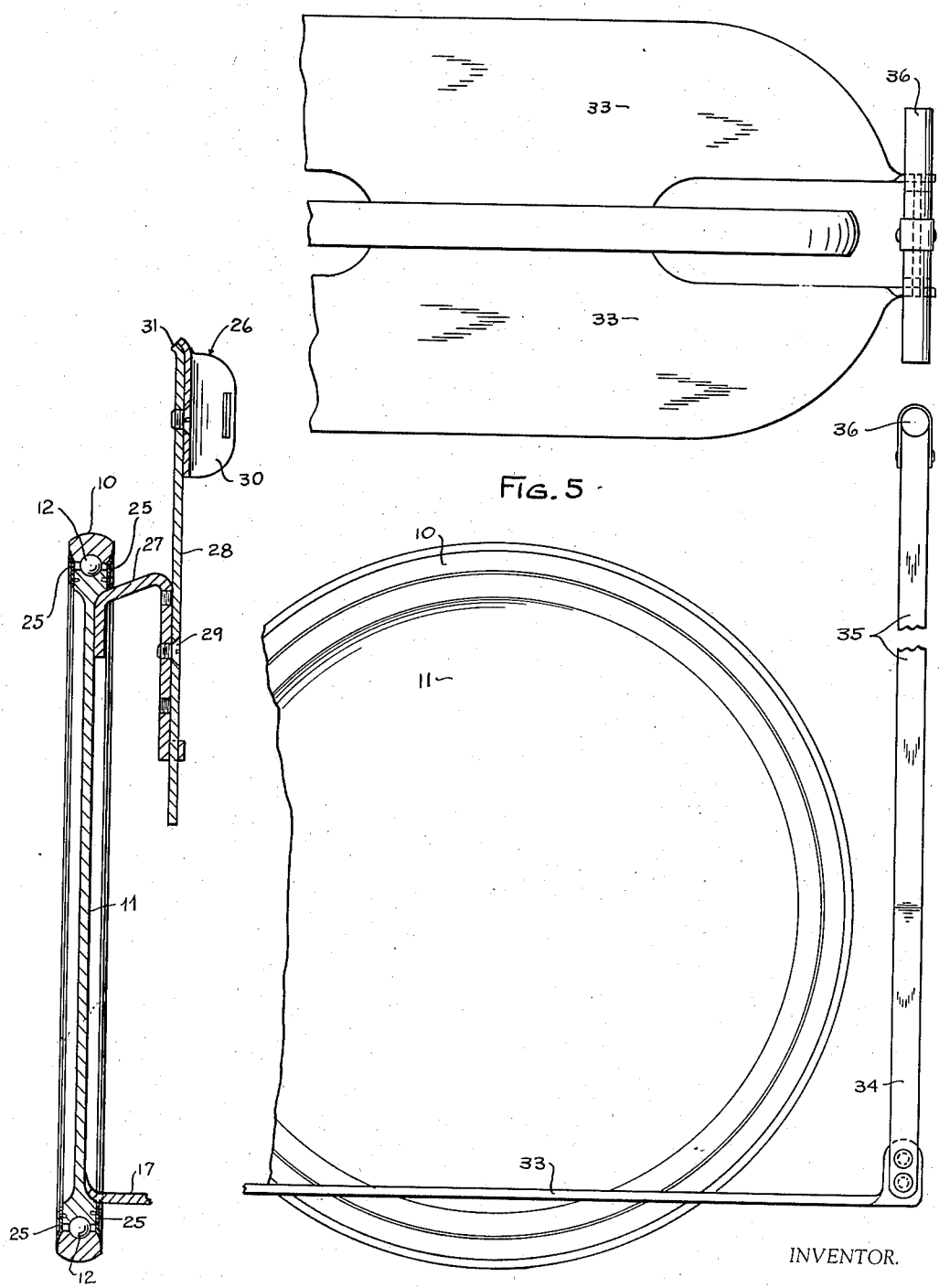
Fig. 3 is a sectional view generally similar to Fig. 2, showing a modification of my invention.
Fig. 4 is an elevational view of a further modification of my invention, wherein a foot-rest is provided on each side of the wheel, together with a rigid handle, permitting the device to be propelled by one foot.
Fig. 5 is a plan view of the modification of Fig. 4.
Figure 7:
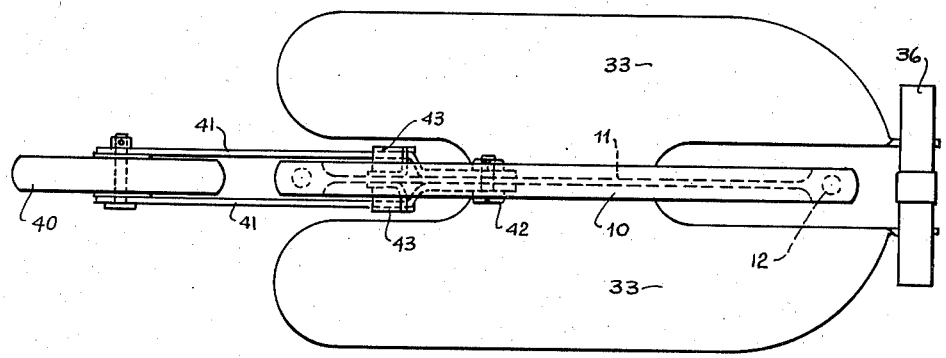
Fig. 7 is a plan view of the device of Fig. 6.

Referring now to Fig. 3, I have shown a modification of my invention generally similar to that illustrated in Figs. 1 and 2, but wherein guard strips of flexible material, such as leather, indicated at 25—25, are secured to the inner and outer peripheral faces of the wheel body 11, and are adapted to overlie the opening between the wheel body and the wheel and slidingly engage portions of the wheel to prevent the ingress of dirt and the like to the bearings, or balls.

The leg clamp member for this modification, generally indicated at 26, is adjustable both laterally and vertically to accommodate varying requirements of the person using the skate device. This may be accomplished in various ways, as by welding a short bent arm 27 to the wheel body, provided with a metal strap spaced from the arm to slidably receive the lower portion of an arm 28, the arm 28 being locked in a desired position by a bolt 29 threadedly engaged with the strap and one of several perforations provided in the arm 28.

The upper portion of the arm 28 adjustably supports a strap engaging element 30, the strap engaging element being adjustable in the manner previously described in connection with the arms 27 and 28. Thus, the strap engaging element 30 may be moved either vertically or laterally, as desired, and to prevent undue pressure against the calf of the leg, I preferably bevel the upper edge of the arm 28, as indicated at 31.

Referring now to Figs. 4 and 5, I have shown a further modification of my invention, wherein the wheel 10 and wheel body 11 are assembled in the manner illustrated in Figs. 1 and 2, but two supporting plates 33—33 are rigidly secured to the wheel body and on opposite sides thereof, the forward portion of the plates being rigidly joined to the yoke portion 34 of a rigid upstanding arm. A bar 36 is secured to the top of the arm 35 and serves as a handle. This device is of the scooter type, and is propelled by resting either foot on the plates 33, and propelling with the other foot, and although a braking action may be effected by forcing the yoke 34 in contact with the supporting surface, this would not be necessary since the foot can always be used as a drag.

Figure 6:
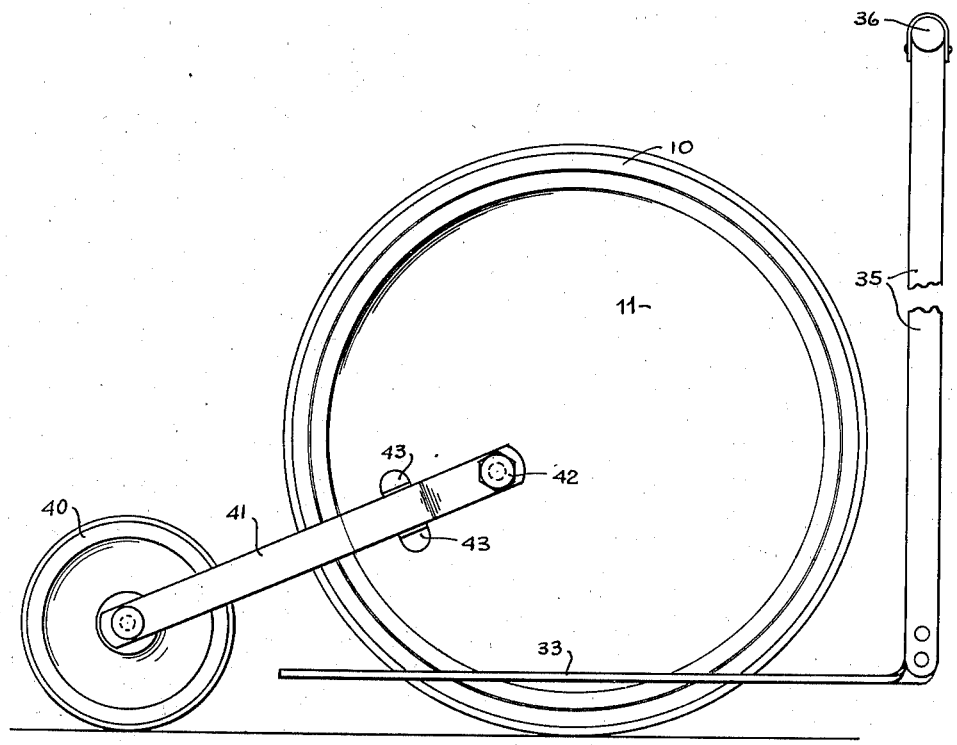
Fig. 6 is an elevational view of a device generally similar to Fig. 4, but provided with an auxiliary wheel.

Fig. 6 illustrates a scooter device similar to that illustrated in Figs. 4 and 5 but wherein an auxiliary wheel 40, relatively small in diameter, is detachably secured to the wheel body by a pair of arms 41 perforated at their upper ends to receive a bolt 42, which is also projected through the wheel body and secured by nuts. Lugs 43 may be provided on the wheel body to cooperate with the locking means for the arms 41 to maintain them in a desired position.

The outer ends of the arms 41 support an axle therebetween upon which the wheel 40 is rotatably mounted and any desired construction may be used. I contemplate that an auxiliary wheel, as illustrated, may be used both with the skate device and the scooter device as an aid in learning to operate the devices, and the auxiliary wheel may be subsequently discarded, if desired, by detaching the arms 41 from the wheel body, or the arms may be pivoted to the wheel body and a catch provided to hold the arms in inoperative position whereby, upon release of the catch, the arms may be swung out of ground-engaging position, if desired.

Although I have shown and described preferred forms of my invention, I contemplate that numerous and extensive departures may be made therefrom without departing from the spirit of my invention or the scope of the appended claims.

Having thus described my invention, what I claim is:

1. A skating or the like device comprising a disc-form wheel body, a wheel encircling the wheel body, bearing elements intermediate the wheel body and wheel rotatably supporting the wheel, a foot support rigidly secured to the wheel body a substantial distance below the axis of rotation of the wheel and adjacent the wheel periphery, and a leg engaging element rigidly secured to the wheel body and extending upwardly therefrom.

2. A skating or the like device comprising a disc-form wheel body having a peripheral bearing groove formed therein, a wheel encircling the wheel body having a cooperating bearing groove on the inner face thereof, bearing elements in said grooves rotatably supporting the wheel and maintaining the wheel body and wheel in assembled relation, a plate element forming a foot support rigidly secured to the lower portion of the wheel body and extending laterally therefrom, and an adjustable leg engaging element secured to the upper portion of the wheel body adapted to abut the calf of the leg.

3. A skating or the like device comprising a disc-form wheel body, a wheel encircling the wheel body, bearing elements engaging the wheel body and wheel to rotatably support the wheel and maintain the wheel body and wheel in spaced relation, and an annular guard element of flexible material secured to the wheel body and slidably engaging the wheel to prevent ingress of foreign material to the bearing elements, a foot support rigidly secured to the wheel body, a substantial distance beneath the axis of rotation of the wheel, and a leg engaging element rigidly secured to the wheel body and extending upwardly therefrom.

ALAN R. BRANSON.